United States Patent
Hardy et al.

(10) Patent No.: US 9,315,167 B1
(45) Date of Patent: Apr. 19, 2016

(54) BUMPERS INCLUDING A REINFORCEMENT BRACKET AND VEHICLES INCORPORATING THE SAME

(71) Applicant: Toyota Motor Engineering & Manufacturing North America, Inc., Erlanger, KY (US)

(72) Inventors: William A. Hardy, Tecumseh, MI (US); Tyler E. Schnug, Northville, MI (US); Kuo Sun, Ann Arbor, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 0 days.

(21) Appl. No.: 14/507,971

(22) Filed: Oct. 7, 2014

(51) Int. Cl.
| | |
|---|---|
| B60R 19/00 | (2006.01) |
| B60R 19/04 | (2006.01) |
| B60R 19/02 | (2006.01) |
| B62D 25/08 | (2006.01) |

(52) U.S. Cl.
CPC .............. B60R 19/04 (2013.01); B60R 19/023 (2013.01); B62D 25/082 (2013.01)

(58) Field of Classification Search
CPC ..... B60R 19/04; B60R 19/023; B62D 25/082
USPC ........................ 293/155, 102, 120; 296/187.1
See application file for complete search history.

(56) References Cited

U.S. PATENT DOCUMENTS

| | | | |
|---|---|---|---|
| 6,644,699 B2 | 11/2003 | Anderson et al. | |
| 6,695,368 B1 | 2/2004 | Weykamp et al. | |
| 7,703,834 B1 * | 4/2010 | Hardy | B60R 9/06 296/102 |
| 8,403,385 B2 | 3/2013 | Sugimoto et al. | |
| 8,414,041 B2 | 4/2013 | Paare et al. | |
| 8,505,990 B2 | 8/2013 | Czopek et al. | |
| 2008/0023972 A1 * | 1/2008 | Ohno et al. | 293/155 |
| 2014/0001780 A1 | 1/2014 | Inoue | |
| 2014/0062106 A1 | 3/2014 | Han | |
| 2014/0091595 A1 | 4/2014 | Ramoutar et al. | |
| 2014/0375082 A1 * | 12/2014 | Watanabe | 296/187.1 |

FOREIGN PATENT DOCUMENTS

| | | |
|---|---|---|
| JP | 2008162344 | 7/2008 |
| JP | 2012228907 | 11/2012 |
| JP | 2014113893 | 6/2014 |

OTHER PUBLICATIONS www.autostell.org: "Small Overlap Test—Update and Review", Sean O'Malley, Insurance Institute for Highway Safety, May 14, 2014, Livonia, Michigan.

* cited by examiner

*Primary Examiner* — Joseph D Pape
(74) *Attorney, Agent, or Firm* — Dinsmore & Shohl LLP (57) ABSTRACT

Bumpers and vehicles that include bumpers are disclosed herein. In one embodiment, a bumper includes a bumper beam assembly, where the bumper beam assembly extends in a vehicle lateral direction, the bumper beam assembly including a front side that is oriented to face forward in a vehicle longitudinal direction that is transverse to the vehicle lateral direction, and a reinforcement bracket coupled to the front side of the bumper beam assembly, the reinforcement bracket including an inboard edge coupled to the front side of the bumper beam assembly, an outboard edge coupled to the front side of the bumper beam assembly and positioned outboard of the inboard edge, and a central portion that extends between the inboard edge and the outboard edge in the vehicle longitudinal direction, where at least a portion of the central portion extends in a direction that is transverse to the vehicle longitudinal direction.

19 Claims, 5 Drawing Sheets

FIG. 4

BUMPERS INCLUDING A REINFORCEMENT BRACKET AND VEHICLES INCORPORATING THE SAME

TECHNICAL FIELD

The present specification generally relates to bumpers and vehicles that include bumpers, and more specifically, bumpers that include a reinforcement bracket.

BACKGROUND

Vehicles may be equipped with bumper systems and crash protection structures that elastically and plastically deform to absorb energy in the event of an impact.

In one example, a substantial portion of energy from an impact with a small front bumper overlap may be directed outboard of many of the energy absorbing structures of the vehicle. Because a substantial portion of the energy from the impact is directed into the bumper assembly at a position that is outboard of many of the energy absorbing structures of the vehicle, the energy from the impact may not be absorbed or may only be partially absorbed by those energy absorbing structures of the vehicle. The unabsorbed energy may be directed into a front suspension unit and transferred rearward along the vehicle as the front suspension unit contacts vehicle structures proximate to a passenger cabin of the vehicle.

Accordingly, a need exists for alternative structures for transferring energy and absorbing energy from an impact with a small overlap to the front bumper.

SUMMARY

In one embodiment, a bumper includes a bumper beam assembly, where the bumper beam assembly extends in a vehicle lateral direction, the bumper beam assembly including a front side that is oriented to face forward in a vehicle longitudinal direction that is transverse to the vehicle lateral direction, and a reinforcement bracket coupled to the front side of the bumper beam assembly, the reinforcement bracket including an inboard edge coupled to the front side of the bumper beam assembly, an outboard edge coupled to the front side of the bumper beam assembly and positioned outboard of the inboard edge, and a central portion that extends between the inboard edge and the outboard edge in the vehicle longitudinal direction, where at least a portion of the central portion extends in a direction that is transverse to the vehicle longitudinal direction.

In another embodiment, a vehicle includes a side support that extends in a vehicle longitudinal direction, a bumper beam assembly that is coupled to the side support, where the bumper beam assembly extends in a vehicle lateral direction that is transverse to the vehicle longitudinal direction, and where the bumper beam assembly includes a front side that is oriented to face forward in the vehicle longitudinal direction, and a reinforcement bracket that is coupled to the front side of the bumper beam assembly, the reinforcement bracket including an inboard edge that is coupled to the front side of the bumper beam assembly, an outboard edge that is coupled to the front side of the bumper beam assembly and that is positioned outboard of the inboard edge, and a central portion that extends between the inboard edge and the outboard edge in the vehicle longitudinal direction, where at least a portion of the central portion extends in a direction that is transverse to the side support.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Vehicles according to the present specification include a bumper beam assembly, where the bumper beam assembly extends in a vehicle lateral direction, and a front side of the bumper beam assembly is oriented to face forward in a vehicle longitudinal direction. A reinforcement bracket is coupled to the front side of the bumper beam assembly, the reinforcement bracket including an inboard edge, an outboard edge, and a central portion that extends between the inboard edge and the outboard edge of the reinforcement bracket, where at least a portion of the central portion extends in a direction that is transverse to the vehicle longitudinal direction. In some embodiments, the bumper beam assembly is coupled to a side support that extends in the vehicle longitudinal direction, and at least a portion of the central portion of the reinforcement bracket extends in a direction that is transverse to the side support. These and other embodiments will be described in more detail below in reference to the appended drawings.

As used herein, the term "vehicle longitudinal direction" refers to the forward-rearward direction of the vehicle (i.e., in the +/− vehicle X-direction depicted in FIGS. 1-4). The term "vehicle lateral direction" refers to the cross-vehicle direction (i.e., in the +/− vehicle Y-direction depicted in FIGS. 1-4), and is transverse to the vehicle longitudinal direction. The term "vehicle vertical direction" refers to the upward-downward direction of the vehicle (i.e., in the +/− vehicle Z-direction depicted in FIGS. 1-4). Further, the terms "inboard" and "outboard" are used to describe the relative positioning of various components of the vehicle. Referring to FIGS. 1-4, the term "outboard" as used herein refers to the relative location of a component in direction 12 with respect to a vehicle centerline 10. The term "inboard" as used herein refers to the relative location of a component in direction 14 with respect to the vehicle centerline 10. Because the vehicle structures may be generally symmetrical about the vehicle centerline 10, the direction to which use of terms "inboard" and "outboard" refer may be mirrored about the vehicle centerline 10 when evaluating components positioned along opposite sides of the vehicle 100.

Motor vehicles that incorporate elements according to the present disclosure may include a variety of construction methodologies that are conventionally known, including the unibody construction methodology depicted in FIGS. 1-4 as well as a body-on-frame construction methodology. While the embodiments of the present disclosure are described and depicted herein in reference to unibody structures, it should be understood that vehicles that are constructed with body-on-frame construction may incorporate the elements that are shown and described herein.

Figure 1:
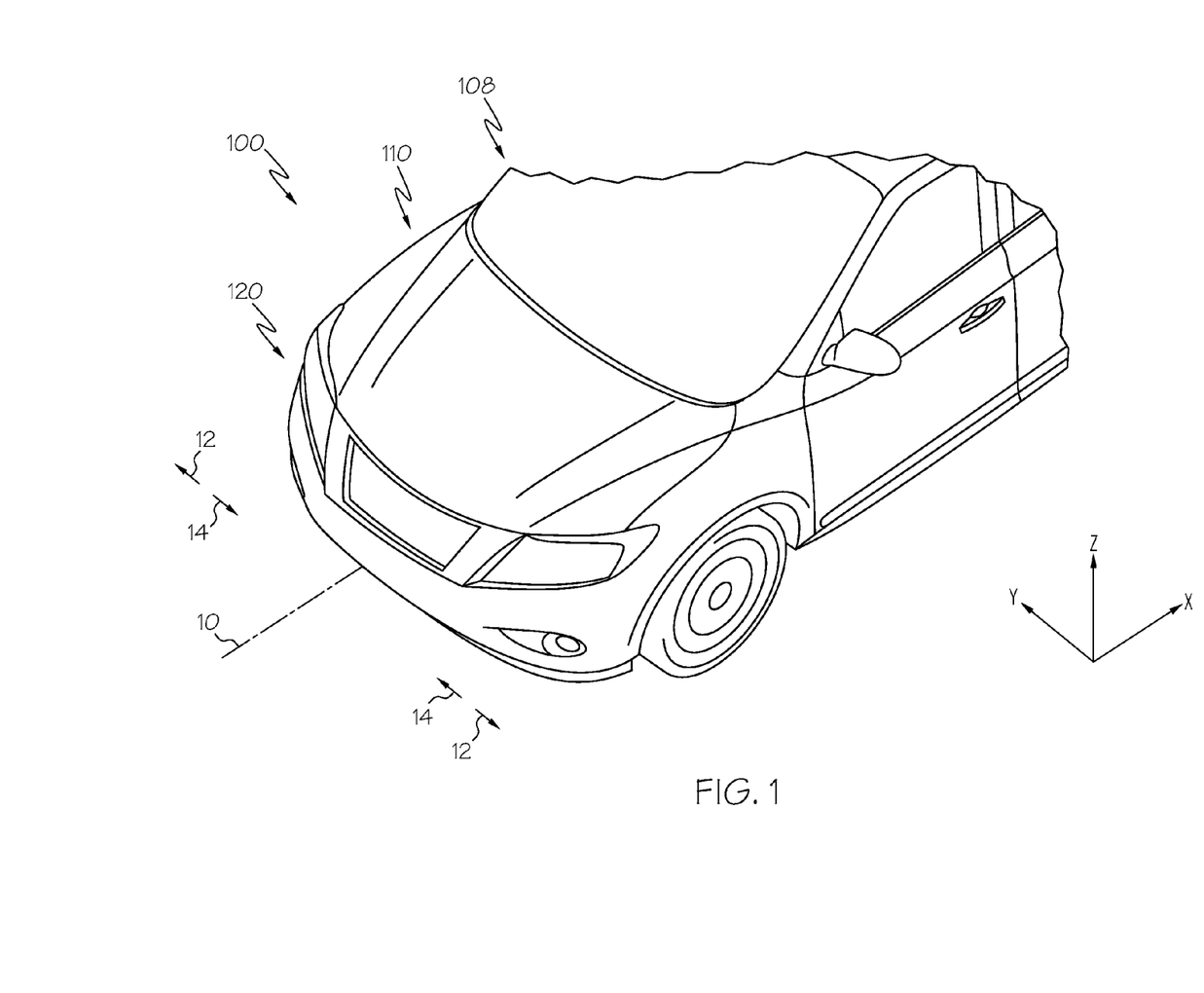
FIG. 1 schematically depicts a perspective view of a vehicle according to one or more embodiments shown or described herein.

Referring initially to FIG. 1, a vehicle 100 is depicted. The vehicle 100 includes a unibody 110 onto which a vehicle drivetrain is coupled. The vehicle 100 also includes a cabin 108 that is integral with the unibody 110. The cabin 108 generally defines a passenger cabin of the vehicle 100. The vehicle 100 includes a bumper 120 that is positioned at the front of the vehicle 100.

Figure 2A:
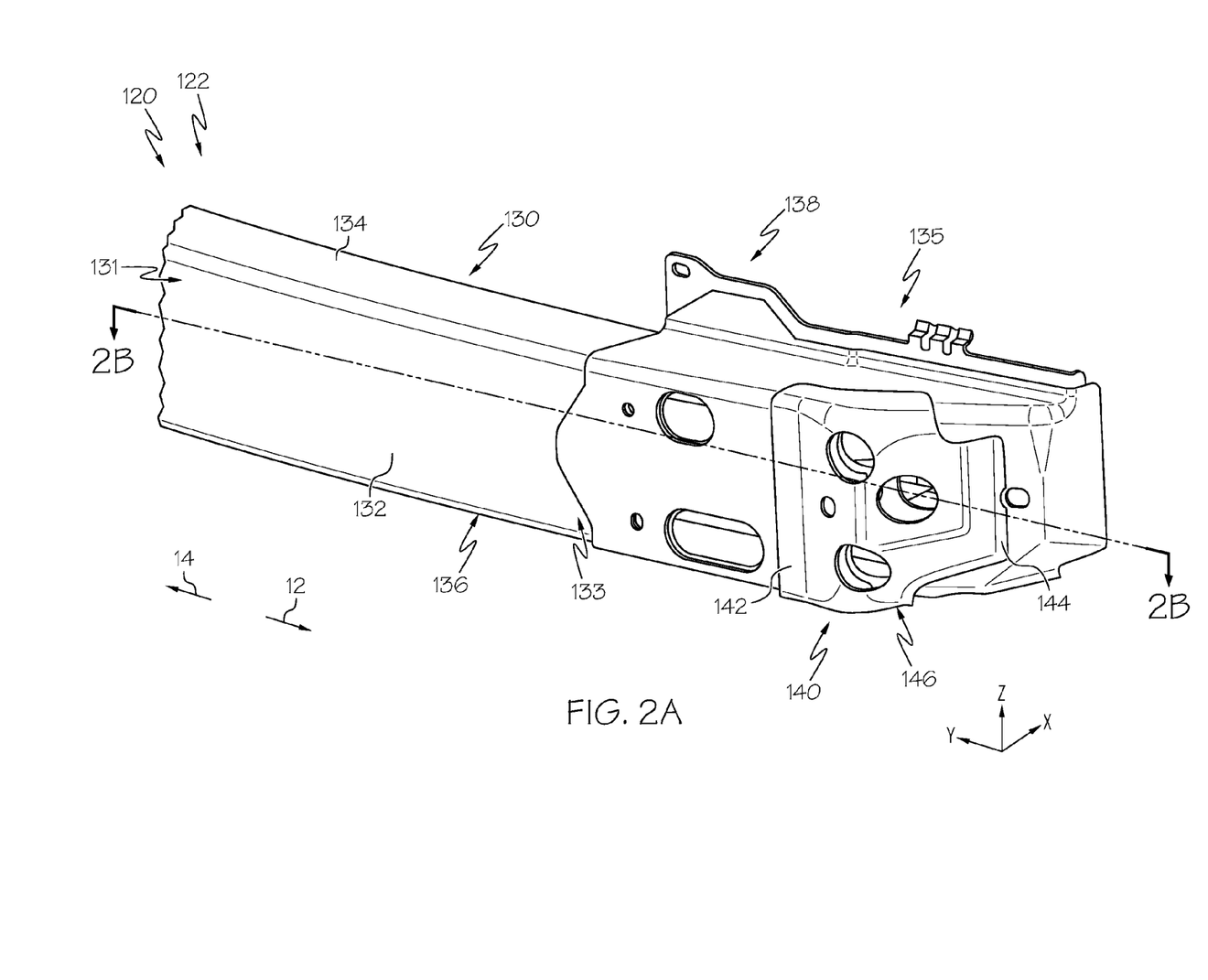
FIG. 2A schematically depicts a perspective view of a bumper beam assembly and a reinforcement bracket according to one or more embodiments shown or described herein.

Referring to FIG. 2A, the bumper 120 is depicted. The bumper 120 includes a bumper beam assembly 122, which may include a beam 130 and a bumper extension portion 138. The beam 130 and the bumper extension portion 138 extend in the vehicle lateral direction. The beam 130 may have a generally curved shape, as depicted in FIG. 2A. More specifically, an inboard position 131 on a front side 132 of the beam 130 may be positioned forward of an outboard position 133 on the front side 132 of the beam 130 in the vehicle longitudinal direction, thereby giving the beam 130 a generally curved shape. In other embodiments, the beam 130 may have a generally straight shape extending in the vehicle lateral direction. The beam 130 may alternatively have any suitable shape that extends in the vehicle lateral direction.

The bumper extension portion 138 is positioned at an outboard end of the beam 130. The bumper extension portion 138 may be formed as a separate member that is coupled to the beam 130 to form the bumper beam assembly 122. Alternatively, the bumper extension portion 138 may be integrally formed with the beam 130 to form the bumper beam assembly 122. In embodiments where the bumper extension portion 138 is coupled to the beam 130, as shown in FIG. 2A, the bumper extension portion 138 may be coupled to the beam 130 through a variety of joining techniques, including, but not limited to, a welded attachment, a brazed attachment, mechanical fasteners, and/or structural adhesives.

The beam 130 and the bumper extension portion 138 of the bumper beam assembly 122 include the front side 132 that is oriented to face forward in the vehicle longitudinal direction. The front side 132 of the bumper beam assembly 122 may be a generally planar surface that extends in the vehicle lateral direction. In other embodiments, the front side 132 of the bumper beam assembly 122 may include a contoured surface that extends in the vehicle lateral direction. The front side 132 of the bumper beam assembly 122 may alternatively include any suitably shaped surface. The beam 130 and the bumper extension portion 138 of the bumper beam assembly 122 include a top side 134 and a bottom side 136 that is positioned opposite the top side 134. The top side 134 and the bottom side 136 of the bumper beam assembly 122 may be oriented transverse to the front side 132 of the bumper beam assembly 122.

The bumper 120 includes a reinforcement bracket 140 that is coupled to the bumper beam assembly 122 at an outboard end 135 of the bumper beam assembly 122. The reinforcement bracket 140 may be formed from a variety of materials including, for example and without limitation, metals, composites, and the like, and may be formed by any suitable method or combination of methods such as stamping, forging, machining, and the like. The reinforcement bracket 140 is coupled to the front side 132 of the bumper beam assembly 122. In the depicted embodiment, the reinforcement bracket 140 is coupled to the front side 132 of the bumper extension portion 138. In some embodiments, the reinforcement bracket 140 may be coupled to the front side 132 of the beam 130. The reinforcement bracket 140 may alternatively be coupled to the front side 132 of the beam 130 and the bumper extension portion 138 such that the reinforcement bracket spans between the beam 130 and the bumper extension portion 138.

The reinforcement bracket 140 includes an inboard edge 142 and an outboard edge 144 that is positioned outboard from the inboard edge 142 in the vehicle lateral direction. The inboard edge 142 and the outboard edge 144 of the reinforcement bracket 140 are coupled to the front side 132 of the bumper beam assembly 122. The inboard edge 142 and the outboard edge 144 may be coupled to the front side 132 of the bumper beam assembly 122 through a variety of joining techniques, including, but not limited to, a welded attachment, a brazed attachment, mechanical fasteners, and/or structural adhesives. The reinforcement bracket 140 includes a central portion 146 that is positioned between the inboard edge 142 and the outboard edge 144 in the vehicle lateral direction.

The central portion 146 may extend between the top side 134 and the bottom side 136 of the bumper beam assembly 122 in the vehicle vertical direction. In some embodiments, the central portion 146 may extend across the top side 134 and the bottom side 136 of the bumper beam assembly 122 in the vehicle longitudinal direction, such that the reinforcement bracket forms a sleeve over the bumper beam assembly 122. The central portion 146 may be coupled to the top side 134 and/or the bottom side 136 of the bumper extension portion 138 of the bumper beam assembly 122 such that the reinforcement bracket 140 forms a weldment on the bumper beam assembly 122 that is at least partially enclosed. In other embodiments, the central portion 146 may be coupled to the top side 134 and/or the bottom side 136 of the beam 130 of the bumper beam assembly 122 such that the reinforcement bracket 140 forms a weldment on the bumper beam assembly 122 that is at least partially enclosed. The central portion 146 may alternatively be coupled to the top side 134 and/or bottom side 136 of the beam 130 and the bumper extension portion 138 of the bumper beam assembly 122 such that the reinforcement bracket 140 forms a weldment on the bumper beam assembly 122 that is at least partially enclosed. The central portion 146 of the reinforcement bracket 140 may be coupled to the bumper beam assembly 122 through a variety of joining techniques, including, but not limited to, a welded attachment, a brazed attachment, mechanical fasteners, and/or structural adhesives.

Figure 2B:
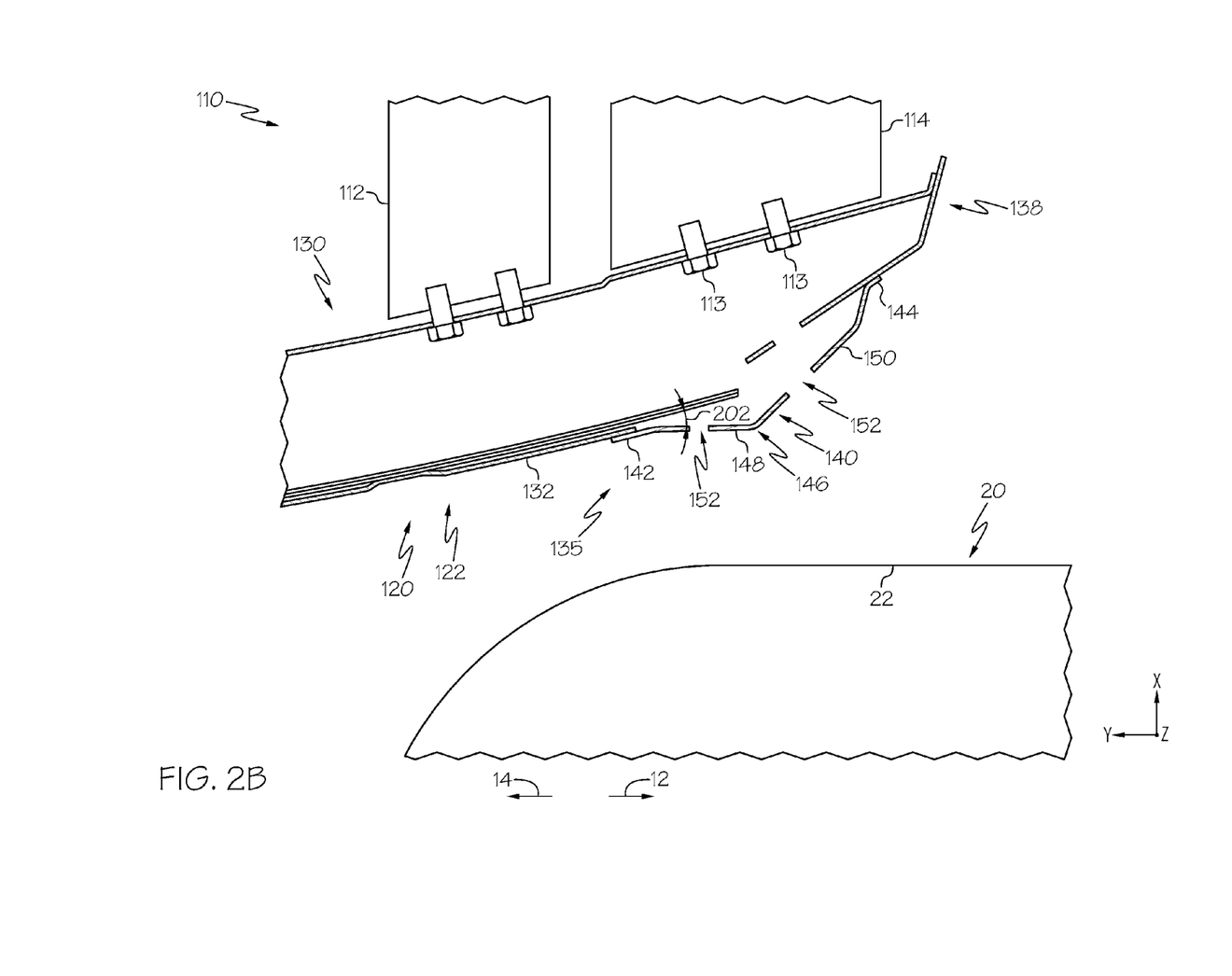
FIG. 2B schematically depicts a section view of a bumper beam assembly and a reinforcement bracket along section 2B-2B depicted in FIG. 2A according to one or more embodiments shown or described herein.

Referring to FIG. 2B, the central portion 146 may include a contact portion 148 that is proximate to the inboard edge 142 of the reinforcement bracket 140. In other words, the contact portion 148 may be nearer to the inboard edge 142 than the outboard edge 144 in the vehicle lateral direction. The central portion 146 may further include an outboard portion 150 that is proximate to the outboard edge 144 of the reinforcement bracket 140. In other words, the outboard portion 150 may be nearer to the outboard edge 144 than the inboard edge 142 in the vehicle lateral direction. The contact portion 148 is positioned forward of the outboard portion 150 in the vehicle longitudinal direction and inboard of the outboard portion 150 in the vehicle lateral direction. The contact portion 148 may extend forward from the front side 132 of the bumper beam assembly 122 at an angle 202, such that the contact portion 148 is detached and spaced apart from the front side 132 of the bumper beam assembly 122. The contact portion 148 is oriented such that the contact portion 148 extends in a direction that is transverse to the vehicle longitudinal direction. Because the contact portion 148 extends in a direction that is transverse to the vehicle longitudinal direction, the contact portion 148 of the reinforcement bracket 140 may assist in directing energy from a small front bumper overlap impact generally rearward in the vehicle longitudinal direction.

The reinforcement bracket 140 may further include one or more access holes 152 that are positioned on the central portion 146 of the reinforcement bracket 140. The access holes 152 may allow access to fasteners 113 that may be positioned rearward of the reinforcement bracket 140 in the vehicle longitudinal direction. In some embodiments the fasteners 113 may couple a spacer 114 to the bumper beam assembly 122, as will be described in greater detail herein.

The bumper beam assembly 122 is coupled to a side support 112. The bumper beam assembly 122 may be coupled to the side support 112 such that the reinforcement bracket 140 is positioned outboard of the side support 112 in the vehicle lateral direction. In the embodiment depicted in FIG. 2B, the beam 130 is coupled to the side support 112 to couple the bumper beam assembly 122 to the side support 112. In other embodiments, the bumper extension portion 138 may be coupled to the side support 112 to couple the bumper beam assembly 122 to the side support 112. Alternatively, both the beam 130 and the bumper extension portion 138 may be coupled to the side support 112 to couple the bumper beam assembly 122 to the side support 112. The side support 112 extends in the vehicle longitudinal direction, and is generally transverse to the bumper beam assembly 122. Because the side support 112 extends in the vehicle longitudinal direction, the contact portion 148 of the reinforcement bracket 140 extends in a direction that is transverse to the side support 112. Because the contact portion 148 extends in a direction that is transverse to the side support 112, the reinforcement bracket 140 may assist in directing energy from a small front bumper overlap impact generally rearward in the vehicle longitudinal direction through the side support 112, compared to without the reinforcement bracket 140, where more energy may be directed in the vehicle lateral direction.

Figure 3:
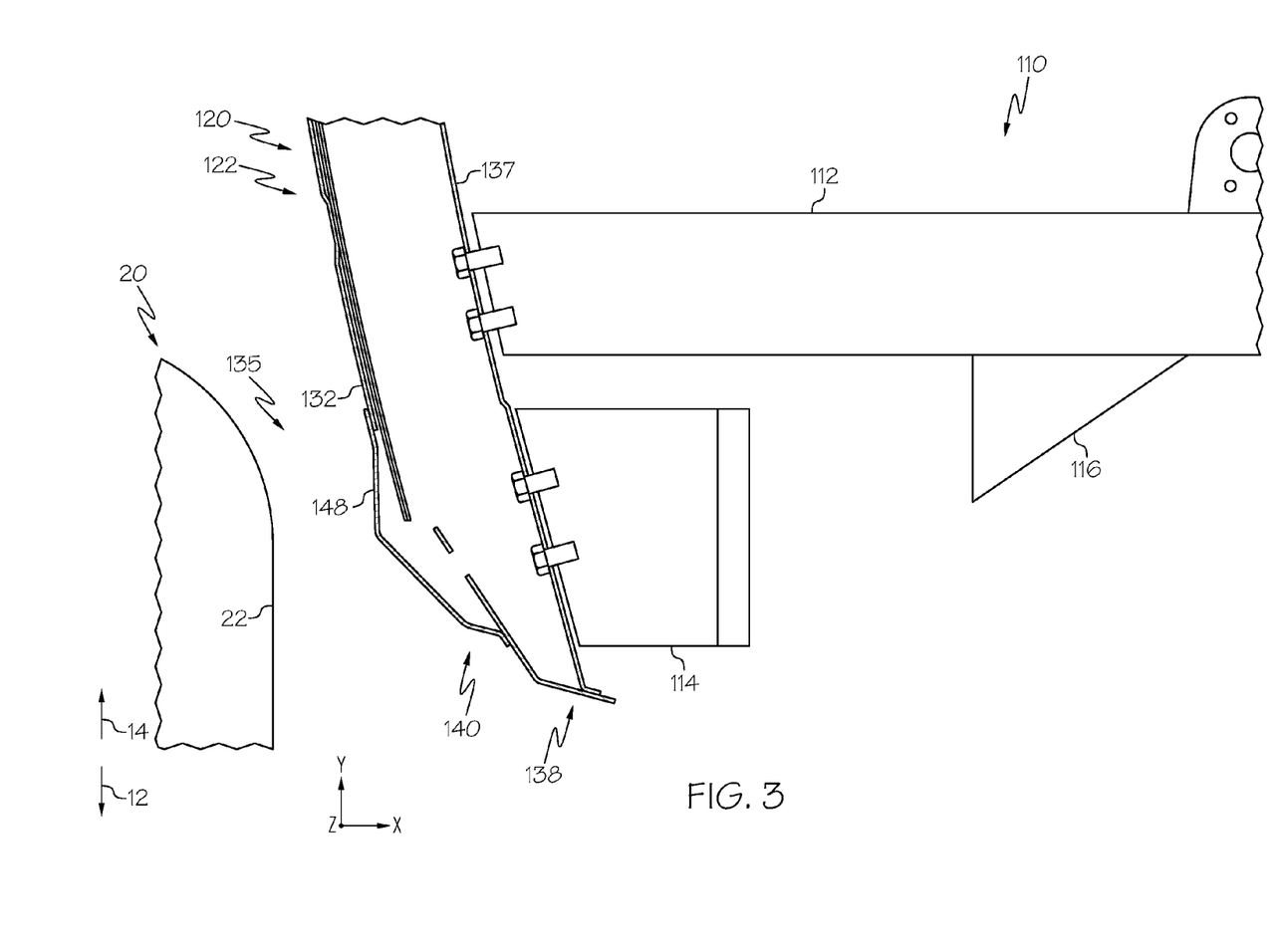
FIG. 3 schematically depicts a top view of a bumper beam assembly and a side support according to one or more embodiments shown or described herein.

Referring to FIG. 3, the beam 130 and the bumper extension portion 138 of the bumper beam assembly 122 include a rear side 137 that is positioned opposite of the front side 132. The rear side 137 of the bumper beam assembly 122 is generally transverse to the top side 134 and the bottom side 136 of the bumper beam assembly 122 that are depicted in FIG. 2A, and the rear side 137 is oriented to face rearward in the vehicle longitudinal direction. In embodiments, the spacer 114 is coupled to the rear side 137 of the bumper beam assembly 122 at a position that is outboard of the side support 112. In embodiments, the spacer 114 may be coupled to the bumper extension portion 138 at a position that is outboard of the side support 112. In other embodiments, the spacer 114 may be coupled to the beam 130 at a position that is outboard of the side support 112. Alternatively, the spacer 114 may be coupled to both the beam 130 and the bumper extension portion 138 of the bumper beam assembly 122 at a position that is outboard of the side support 112.

An engagement member 116 may be coupled to the side support 112. The engagement member 116 may be coupled to the side support at a position that is rearward of the spacer 114 in the vehicle longitudinal direction. During ordinary vehicle operation, the spacer 114 may be detached from the engagement member 116 and spaced apart from the engagement member 116 in the vehicle longitudinal direction. The spacer 114 and the engagement member 116 may assist transferring energy associated with an impact from the bumper beam assembly 122 to the side support 112 during a small front bumper overlap impact.

When a vehicle impacts a barrier, vehicle structures may elastically and plastically deform to absorb energy while slowing the vehicle from its previous operating speed. The vehicle structures divert and absorb the energy associated with the moving vehicle into energy that deforms the vehicle structures. The vehicle structures may be designed to accommodate the introduction of the energy of the impact, such that the energy associated with the impact may be controllably dissipated and directed through selective and preferential deformation of the vehicle structures.

The front corner of the vehicle may strike by an object in what is referred to herein as a small front bumper overlap or a small overlap impact. In a small front bumper overlap impact, the impact occurs at an outboard portion of the vehicle (evaluated in a vehicle lateral direction), and only a portion of the front bumper strikes the object. In some small front bumper overlap impacts, only about 25% of the front bumper strikes the object. In such impacts, some of the energy dissipation elements of the vehicle may not be initiated or may be only partially initiated. In such impacts, the energy that is introduced to the vehicle structures may be non-symmetrical when evaluated in the vehicle lateral direction. Accordingly, the reaction of the vehicle structures to the energy introduced by the small overlap impacts may introduce a non-symmetrical response to the vehicle structures. Referring to embodiments disclosed herein, the structural members of the unibody 110 for example, may be non-symmetrically loaded when the vehicle is involved in a small overlap impact.

When a vehicle strikes an object with a front corner of the vehicle, the structures of the vehicle plastically and elastically deform to absorb the energy of the impact. Because only a portion of the front bumper strikes an object during a small front bumper overlap impact, all of the energy absorbing structures associated with the front bumper may have a reduced effect on the dissipation of energy of the impact. In particular, some of the energy absorbing structures associated with the front bumper of the vehicle may not be activated or may be only partially activated, such that a portion of the energy absorbing structure of the vehicle may not dissipate energy associated with the small front bumper overlap impact. Instead, the energy from the impact may be directed into the front suspension unit of the vehicle proximate to the barrier that the vehicle impacts.

Referring to FIG. 3, the bumper 120 of a vehicle 100 is depicted prior a small front bumper overlap impact with a barrier 20. As depicted in FIG. 3, during ordinary vehicle operation and prior to a small front bumper overlap impact, the bumper beam assembly 122 may be positioned in a deactivated configuration. In the deactivated configuration, the spacer 114 detached from and spaced apart from the engagement member 116 in the vehicle longitudinal direction.

In some impact configurations, the vehicle 100 may collide with a barrier 20 that has a vehicle-facing surface 22. The vehicle-facing surface 22 of the barrier 20 may extend in a direction that is transverse to the vehicle longitudinal direction. Accordingly, in such impact configurations, the contact portion 148 of the reinforcement bracket 140 extends in the same direction as the vehicle-facing surface 22 of the barrier 20. In some impact configurations, such as the small front bumper overlap impact depicted in FIG. 3, the contact portion 148 of the reinforcement bracket 140 may at least partially overlap the vehicle-facing surface 22 of the barrier 20 in the vehicle lateral direction.

Figure 4:
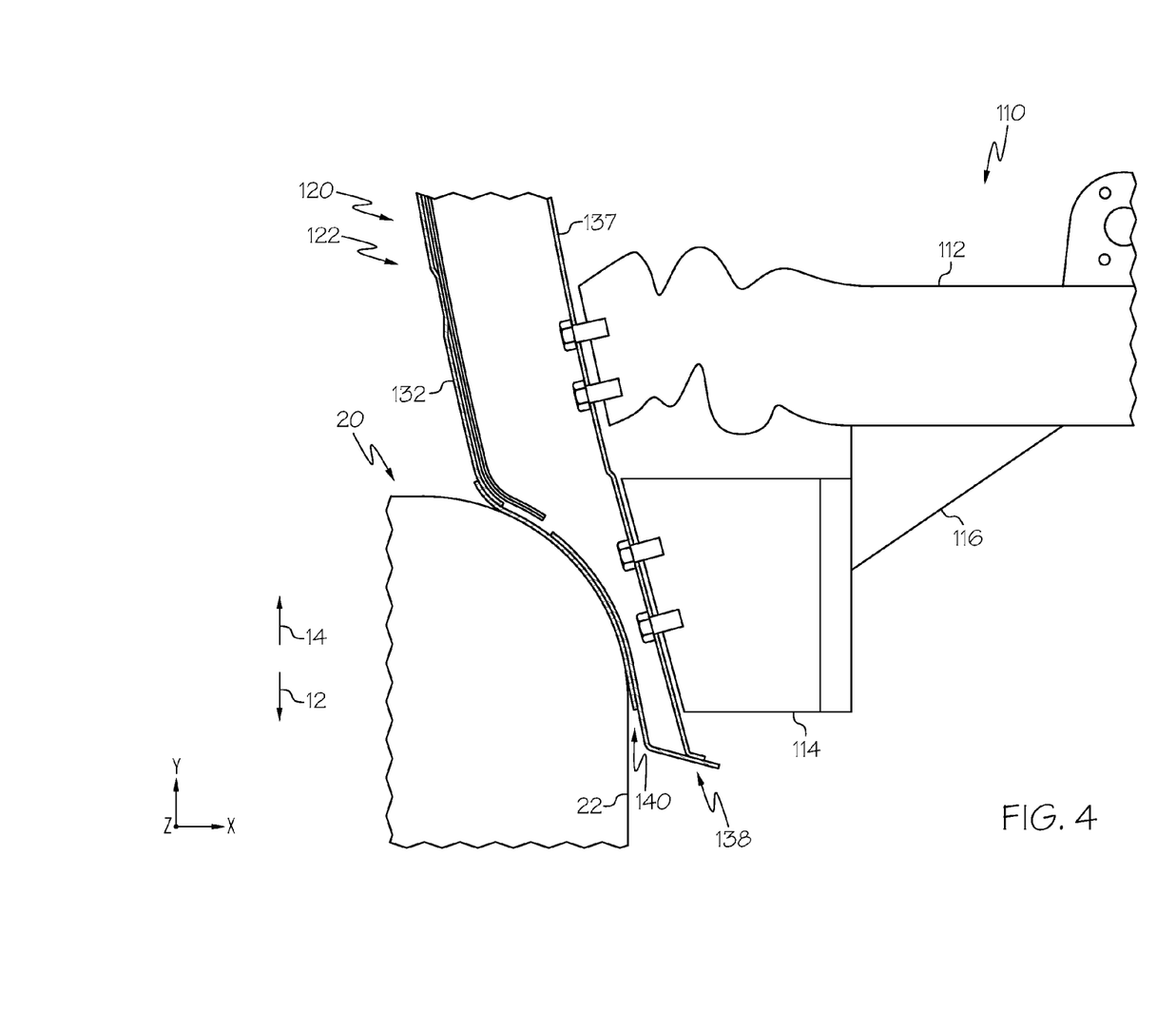
FIG. 4 schematically depicts a top view of a bumper beam assembly and a side support under deformation according to one or more of the embodiments shown or described herein.

Referring to FIG. 4, the vehicle-facing surface 22 of the barrier 20 may impact the bumper 120. Because the contact portion 148 at least partially overlaps the vehicle-facing surface 22 of the barrier, the impact between the vehicle-facing surface 22 of the barrier 20 and the bumper 120 may be directed into the contact portion 148 of the reinforcement bracket 140. Because the contact portion 148 and the vehicle-facing surface 22 of the barrier 20 are transverse to the vehicle longitudinal direction, a substantial portion of the energy associated with the impact may be directed rearward in the vehicle longitudinal direction, as opposed to being directed inboard or outboard in the vehicle lateral direction.

Because the contact portion 148 of the reinforcement bracket 140 may direct a substantial portion of the energy associated with the impact rearward in the vehicle longitudinal direction, the bumper beam assembly 122 may deform and translate primarily rearward in the vehicle longitudinal direction. As described hereinabove, the bumper beam assembly 122 is coupled to the side support 112. Because the bumper beam assembly 122 may deform and translate primarily rearward in the vehicle longitudinal direction, the bumper beam assembly 122 may direct energy into the side support 112 such that the energy is directed primarily rearward in the vehicle longitudinal direction. Because the energy associated with the impact is directed primarily rearward in the vehicle longitudinal direction, the side support may remain near its original longitudinal orientation as opposed to rotating inboard or outboard and away from the impact. As the energy associated with the impact causes the side support 112 to plastically and elastically deform, the side support 112 may absorb more energy when the side support 112 is maintained near its original longitudinal orientation as opposed to when the side support 112 deflects inboard or outboard and away from the impact.

By absorbing more of the energy associated with the impact, the side support 112 may reduce the amount of energy that is directed rearward toward the passenger cabin of the vehicle 100. Accordingly, by directing a substantial portion the energy associated with the impact rearward in the vehicle longitudinal direction, the reinforcement bracket 140 may reduce the amount of energy associated with the impact that is directed into the passenger cabin of the vehicle 100.

Further, as the bumper beam assembly 122 plastically and elastically deforms and translates rearward in the vehicle longitudinal direction, energy associated with the impact may reposition the bumper beam assembly 122 from the deactivated configuration into an activated configuration. Specifically, as the bumper beam assembly 122 translates rearward, the spacer 114 may translate rearward in the vehicle longitudinal direction. The spacer 114 may translate rearward in the vehicle longitudinal direction such that the spacer 114 contacts the engagement member 116 that is coupled to the side support 112 as the bumper beam assembly 122 is positioned in the activated configuration. As the spacer 114 contacts the engagement member 116, the bumper beam assembly 122 may transmit energy associated with the impact to the side support 112 through the spacer 114 and the engagement member 116. Because the spacer 114 may be positioned outboard of the side support 112 in the vehicle lateral direction, the spacer 114 and the engagement member 116 may assist in transmitting energy associated with the impact that is directed outboard of the side support 112 from the bumper beam assembly 122 to the side support 112, thereby reducing the amount of energy that may be directed into a front suspension unit and subsequently directed into the cabin 108. By reducing the amount of energy that may be directed into the front suspension unit, the spacer 114 and the engagement member 116 may reduce the amount of energy associated with the impact that is directed into the cabin 108.

It should now be understood that bumpers according to the present disclosure may include a bumper beam assembly including a reinforcement bracket coupled to a front side of the bumper beam assembly. The reinforcement bracket includes an inboard edge, an outboard edge, and a central portion positioned between the inboard edge and the outboard edge, where at least a portion of the central portion extends in a direction that is transverse to the vehicle longitudinal direction. Because at least a portion of the central portion extends in a direction that is transverse to the vehicle longitudinal direction, in some impact configurations, the reinforcement bracket may assist in directing energy associated with an impact generally rearward in a vehicle longitudinal direction. By directing energy associated with an impact generally rearward in the vehicle longitudinal direction, the reinforcement bracket may assist in directing energy associated with the impact into energy absorbing structures of a vehicle as opposed to a cabin of the vehicle.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A bumper comprising:
   a bumper beam assembly, wherein the bumper beam assembly extends in a vehicle lateral direction, the bumper beam assembly comprising:
      a front side that is oriented to face forward in a vehicle longitudinal direction that is transverse to the vehicle lateral direction;
      a top side that is oriented transverse to the front side;
      a bottom side that is oriented transverse to the front side; and
   a reinforcement bracket positioned on the front side of the bumper beam assembly at an outboard end of the bumper beam assembly, wherein the reinforcement bracket is coupled to the front side of the bumper beam assembly and wherein at least a portion of the reinforcement bracket is spaced apart from the front side of the bumper beam assembly, the reinforcement bracket comprising:
      an inboard edge positioned on the front side of the bumper beam assembly;
      an outboard edge positioned on the front side of the bumper beam assembly and positioned outboard of the inboard edge; and a central portion that extends between the inboard edge and the outboard edge in the vehicle longitudinal direction, wherein at least a portion of the central portion extends in a direction that is transverse to the vehicle longitudinal direction.

2. The bumper of claim 1, wherein at least a portion of the central portion of the reinforcement bracket is oriented at an angle with respect to the front side of the bumper beam assembly.

3. The bumper of claim 1, wherein the central portion comprises a contact portion and an outboard portion, wherein the contact portion is positioned inboard of the outboard portion and the contact portion extends in a direction that is transverse to the vehicle longitudinal direction.

4. The bumper of claim 1, wherein the central portion of the reinforcement bracket extends between the top side and the bottom side of the bumper beam assembly.

5. The bumper of claim 4, wherein the central portion of the reinforcement bracket is coupled to the top side and the bottom side of the bumper beam assembly.

6. The bumper of claim 1, wherein the inboard edge and the outboard edge of the reinforcement bracket are coupled to the front side of the bumper beam assembly.

7. The bumper of claim 1, wherein the bumper beam assembly comprises a beam, wherein an inboard position of the beam is positioned forward of an outboard position of the beam such that the beam has a generally curved shape.

8. The bumper of claim 1, wherein the bumper beam assembly comprises a beam and a bumper extension portion that is positioned at the outboard end of the bumper beam assembly, wherein the reinforcement bracket is coupled to the bumper extension portion of the bumper beam assembly.

9. A vehicle comprising:
a side support that extends in a vehicle longitudinal direction;
a bumper beam assembly that is coupled to the side support, wherein the bumper beam assembly extends in a vehicle lateral direction that is transverse to the vehicle longitudinal direction, and wherein the bumper beam assembly comprises a front side that is oriented to face forward in the vehicle longitudinal direction; and
a reinforcement bracket that is coupled to the front side of the bumper beam assembly such that the reinforcement bracket is positioned outboard of the side support in the vehicle lateral direction, the reinforcement bracket comprising:
an inboard edge that is coupled to the front side of the bumper beam assembly;
an outboard edge that is coupled to the front side of the bumper beam assembly and that is positioned outboard of the inboard edge; and
a central portion that extends between the inboard edge and the outboard edge in the vehicle longitudinal direction, wherein at least a portion of the central portion extends in a direction that is transverse to the side support.

10. The vehicle of claim 9, wherein at least a portion of the reinforcement bracket is spaced apart from the front side of the bumper beam assembly.

11. The vehicle of claim 9, wherein at least a portion of the central portion of the reinforcement bracket is oriented at an angle with respect to the front side of the bumper beam assembly.

12. The vehicle of claim 9, wherein the central portion comprises a contact portion and an outboard portion, wherein the contact portion is positioned inboard of the outboard portion and the contact portion extends in a direction that is transverse to the vehicle longitudinal direction.

13. The vehicle of claim 9, wherein the bumper beam assembly comprises a beam wherein an inboard position of the beam is positioned forward of an outboard position of the beam such that the beam has a generally curved shape.

14. The vehicle of claim 9, wherein the bumper beam assembly comprises a top side and a bottom side that are transverse to the front side of bumper beam assembly and the reinforcement bracket extends between the top side and the bottom side of the bumper beam assembly.

15. The vehicle of claim 14, wherein the reinforcement bracket is coupled to the top side and the bottom side of the bumper beam assembly.

16. The vehicle of claim 9, wherein the bumper beam assembly further comprises a rear side that is positioned opposite of the front side and that is oriented to face rearward in the vehicle longitudinal direction, and a spacer is coupled to the rear side of the bumper beam assembly.

17. The vehicle of claim 16, further comprising an engagement member that is coupled to the side support and positioned rearward of the spacer in the vehicle longitudinal direction.

18. The vehicle of claim 17, wherein the bumper beam assembly is repositionable between a deactivated configuration and an activated configuration, wherein the spacer is detached and spaced apart from the engagement member in the vehicle longitudinal direction in the deactivated configuration, and the spacer is in contact with the engagement member in the activated configuration.

19. The vehicle of claim 9, wherein the bumper beam assembly comprises a beam and a bumper extension portion that is positioned at an outboard end of the bumper beam assembly, wherein the reinforcement bracket is coupled to the bumper extension portion of the bumper beam assembly.

* * * * *